(12) United States Patent
Tester et al.

(10) Patent No.: US 8,054,220 B1
(45) Date of Patent: *Nov. 8, 2011

(54) VARIABLE MEASUREMENT RATE METHOD FOR POSITIONING SYSTEMS

(75) Inventors: David P. Tester, Swindon (GB); Stephen P. Graham, Henley-on-Thames (GB); Nigel J. Tolson, Reading (GB); Ian G. Watson, Swindon (GB)

(73) Assignee: u-blox AG, Thalwil (CH)

( * ) Notice: Subject to any disclaimer, the term of this patent is extended or adjusted under 35 U.S.C. 154(b) by 385 days.

This patent is subject to a terminal disclaimer.

(21) Appl. No.: 12/326,219

(22) Filed: Dec. 2, 2008

Related U.S. Application Data

(63) Continuation of application No. 11/613,536, filed on Dec. 20, 2006, now Pat. No. 7,460,064.

(51) Int. Cl.
*G01S 19/13* (2010.01)
*G01S 19/34* (2010.01)

(52) U.S. Cl. .............................. 342/357.51; 342/357.74

(58) Field of Classification Search ............... 342/357.4, 342/357.46, 357.51, 357.74; 701/213–215
See application file for complete search history.

(56) References Cited

U.S. PATENT DOCUMENTS

| | | | |
|---|---|---|---|
| 5,365,450 A | 11/1994 | Schuchman et al. | |
| 5,661,460 A | 8/1997 | Sallen et al. | |
| 6,639,516 B1 | 10/2003 | Copley | |
| 6,683,564 B1 | 1/2004 | McBurney | |
| 7,133,685 B2 | 11/2006 | Hose et al. | |
| 7,375,682 B1 | 5/2008 | Tester et al. | |
| 7,460,064 B1 * | 12/2008 | Tester et al. | 342/357.51 |
| 7,538,722 B2 | 5/2009 | Thandu et al. | |
| 7,561,101 B1 | 7/2009 | Tester et al. | |
| 2003/0006931 A1 | 1/2003 | Mages | |
| 2006/0099969 A1 | 5/2006 | Staton et al. | |
| 2006/0152409 A1 | 7/2006 | Raman et al. | |
| 2007/0042790 A1 | 2/2007 | Mohi et al. | 455/456.5 |
| 2007/0057841 A1 | 3/2007 | McBurney et al. | |
| 2007/0118286 A1 | 5/2007 | Wang et al. | 701/213 |
| 2007/0152878 A1 | 7/2007 | Wang et al. | |
| 2007/0237269 A1 | 10/2007 | Lillo et al. | 375/343 |

* cited by examiner

*Primary Examiner* — Dao Phan

(57) ABSTRACT

A method of variable rate measurements in a device. The method generally includes the steps of (A) generating an intermediate signal conveying both a position of the device and a velocity of the device in response to a plurality of navigation signals received from external the device, (B) calculating an extrapolated position of the device at a second time based on the position and the velocity both measured at a first time, (C) adjusting an interval between the second time and a third time in response to a difference between the extrapolated position and the position measured at the second time and (D) generating a position signal conveying the position and the velocity, wherein the third time occurs after the second time and the second time occurs after the first time.

20 Claims, 10 Drawing Sheets

VARIABLE MEASUREMENT RATE METHOD FOR POSITIONING SYSTEMS

CROSS REFERENCE TO RELATED APPLICATIONS

This is a continuation of U.S. patent application Ser. No. 11/613,536, filed Dec. 20, 2006, now U.S. Pat. No. 7,460,064 which is hereby incorporated by reference in its entirety.

The present application is related to U.S. Pat. No. 7,375,682, filed Dec. 20, 2006, and co-pending U.S. patent application Ser. No. 11/613,280, filed Dec. 20, 2006, both of which are hereby incorporated by reference in their entirety.

FIELD OF THE INVENTION

The present invention relates to a method and/or architecture for satellite positioning receivers generally and, more particularly, to a variable measurement rate method for positioning systems.

BACKGROUND OF THE INVENTION

Conventional positioning systems, such as Global Position Satellite (GPS) receivers, are increasingly being integrated into battery operated user equipment (i.e., personal digital assistants and cellular telephones). The positioning systems calculate the locations of the user equipment based on signals received from the GPS satellites. The locations are used to provide applications and services for the benefit of the users. Owing to power consumption constraints in battery operated equipment, conventional positioning systems are normally only enabled on demand from the users.

A utility to the user of the positioning system would be greatly enhanced if the current location was always automatically available for use by the applications and services. In such a case, the applications/services could proactively deliver location-based services to the user without receiving any prior input from the user.

SUMMARY OF THE INVENTION

The present invention concerns a method of variable rate measurements in a device. The method generally comprises the steps of (A) generating an intermediate signal conveying both a position of the device and a velocity of the device in response to a plurality of navigation signals received from external the device, (B) calculating an extrapolated position of the device at a second time based on the position and the velocity both measured at a first time, (C) adjusting an interval between the second time and a third time in response to a difference between the extrapolated position and the position measured at the second time and (D) generating a position signal conveying the position and the velocity, wherein the third time occurs after the second time and the second time occurs after the first time.

The objects, features and advantages of the present invention include providing a variable measurement rate method for positioning systems that may (i) adjust a rate at which position measurements are made, (ii) interpolate the position and a velocity between measurements, (iii) reduce power consumption in the system compared with conventional designs, (iv) utilize a sensor to directly detect motion, (v) account for a maximum anticipated acceleration, (vi) adjust for varying signal conditions, (vii) adaptively learn a routine use from historical position and/or velocity observations and/or (viii) support location-based applications and services.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

The present invention may implement a variable position measurement rate technique for a device in a positioning system. The device generally provides (i) an application subsystem operating within the device and (ii) a user of the device with an impression that the position measuring capability is always-on. Power may be conserved by intelligently varying the rate at which the actual position measurements are made, depending on various conditions under which the device is being used. The present invention is generally intended for use in handheld devices such as cell phones, personal digital assistants, laptop computers, palm computers, heads-up displays and other battery operated equipment.

The rate at which the device makes measurements may be varied depending on (i) the velocity and/or (ii) the acceleration of the user equipment into which the invention is integrated. The measurement rate may also vary depending on the conditions under which the device is operating including (i) a signal to noise ratio, (ii) a rate of temperature change, (iii) an absolute accuracy request and/or (iv) other demands from applications that make use of the positional data from a receiver within the equipment. Furthermore, the measurement rate may be altered by learning anticipated behavior the user associated with the device. By interpolating between the last position measured and a forecast of the next position to be measured, the device generally gives the user the impression that the satellite positioning receiver is always on.

Figure 1:
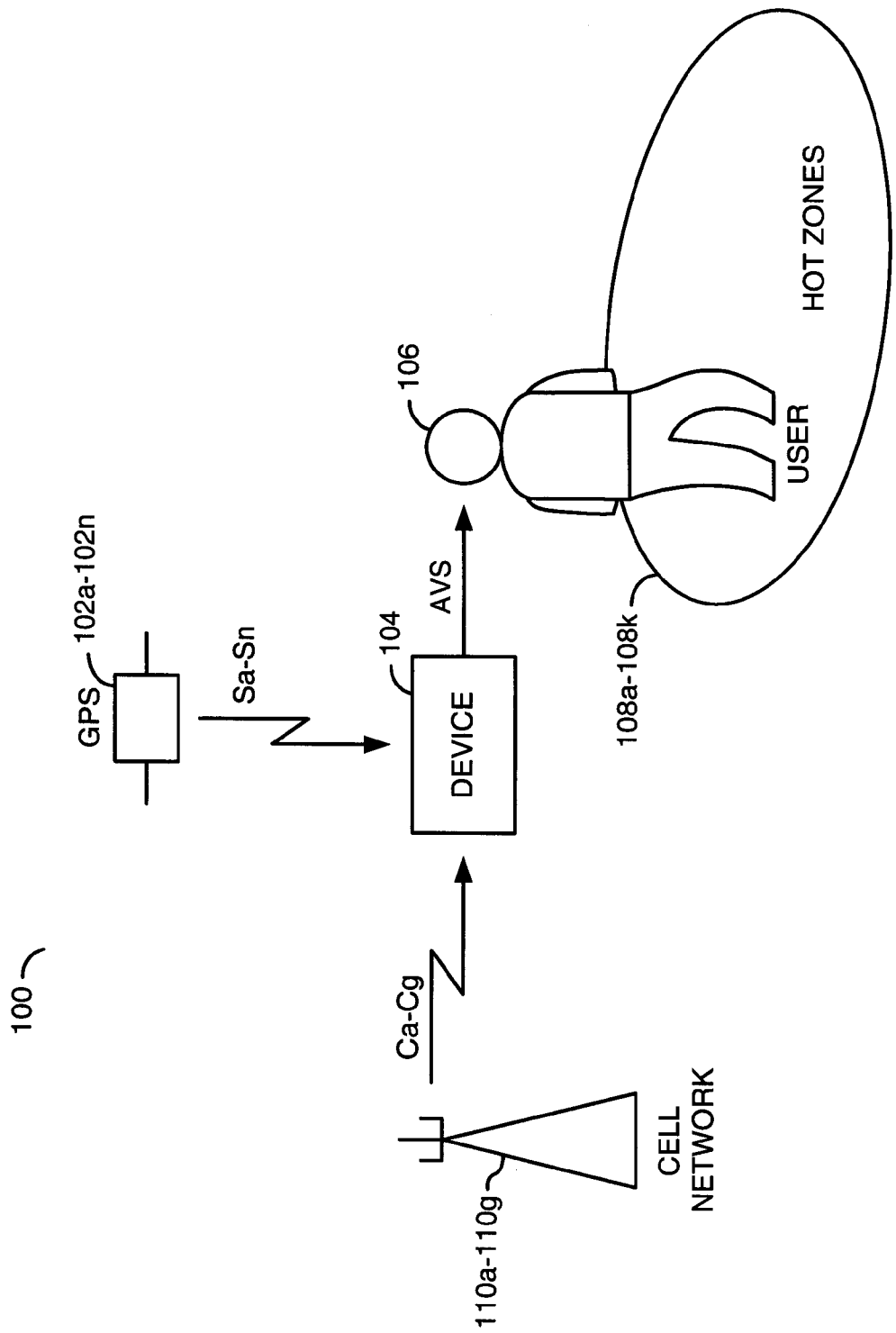
FIG. 1 is a diagram of a system in accordance with a preferred embodiment of the present invention.

Referring to FIG. 1, a diagram of a system 100 is shown in accordance with a preferred embodiment of the present invention. The system 100 generally comprises multiple navigation satellites 102a-102n, a device (or apparatus) 104, a user 106, one or more optional hot zones 108a-108k and one or more optional cellular networks 110a-110g. The device 104 may receive signals (e.g., Sa-Sn) from the navigation satellites 102a-102n. Multiple signals (e.g., Ca-Cg) may be transmitted from the cellular network towers 110a-110g to the device 104. A signal (e.g., AVS) may be generated and presented from the device 104 to the user 106 based on one or more zones 108a-108k where the device 104 is currently located. The signal AVS generally comprises one or more audio signals, one or more visual signals and/or one or more tactile signals (e.g., vibrations) perceivable by the user 106.

In some embodiments, the navigation satellites 102a-102n may be part of the Global Positioning System (GPS) system. In other embodiments, the satellites 102a-102n may be part of the GLObal NAvigation Satellite System (GLONASS). Other space-based positioning systems, such as the proposed Galileo project, may be used as the source of the signals Sa-Sn.

The device 104 may be implemented as a handheld (or portable) electronic device with an embedded navigation receiver. The device 104 may be operational to provide location-based applications and/or services to the user 106 based upon the hot zones 108a-108k, information from the signals Sa-Sn and optionally information from the signals Ca-Cg. The device 104 may be implemented as a variety of items, such as a cell phone, a personal digital assistant (PDA), a laptop computer, a GPS receiver, a heads-up display and/or other battery powered equipment.

Each of the hot zones 108a-108k may be defined in two or more spatial dimensions and optionally in a time dimension. The hot zones 108a-108k may or may not overlap each other in time and/or space in various situations. Each of the hot zones 108a-108k generally defines one or more applications and/or one or more services available to the user 106.

The cellular network towers 110a-110g may be operational to provide cellular telephone services to the device 104. In some cases, the cellular network towers 110a-110g may also provide data services to the device 104. For example, each of the cellular network towers 110a-110g may transmit the definitions of the hot zones 108a-108k in and around a local cellular coverage area to the device 104. In other cases, the cellular network towers 110a-110g may act as references from which the device 104 may triangulate a current location.

Figure 2:
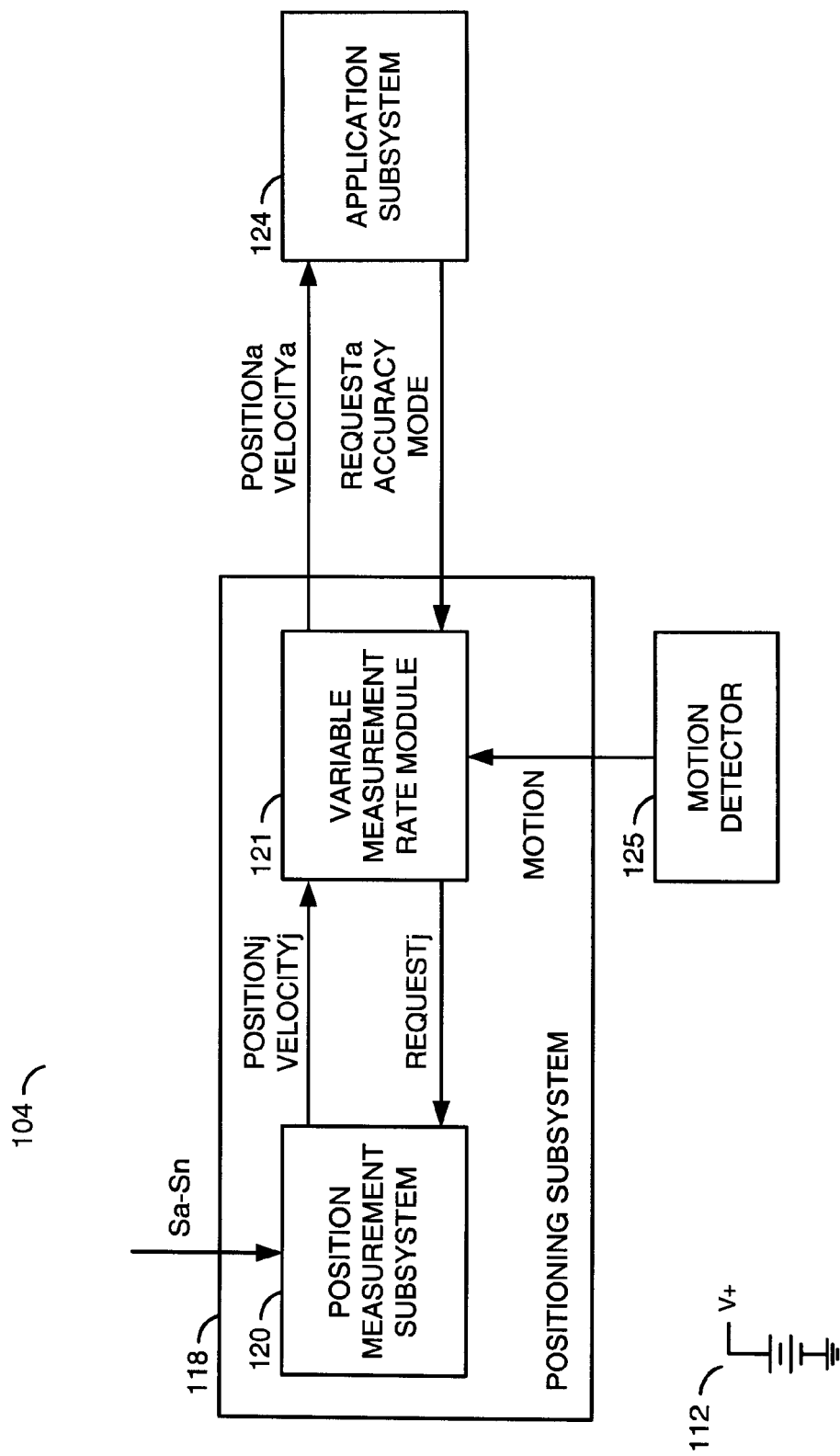
FIG. 2 is a block diagram of an example implementation of a device in the system.

Referring to FIG. 2, a block diagram of an example implementation of the device 104 is shown. The device 104 generally comprises one or more batteries 112, a module (or subsystem) 118, a module (or subsystem) 124 and an optional module (or circuit) 125. The signals Sa-Sn may be received by the subsystem 120. A signal (e.g., POSITIONa) may be generated and presented from the subsystem 118 to the subsystem 124. A signal (e.g., VELOCITYa) may also be generated and presented from the subsystem 118 to the subsystem 124. The subsystem 124 may generate and present a signal (e.g., REQUESTa) to the subsystem 118. A signal (e.g., ACCURACY) may be generated by the subsystem 124 and presented to the subsystem 118. A signal (e.g., MODE) may also be generated by the subsystem 124 and presented to the subsystem 118. The module 125 may generate a signal (e.g., MOTION) that is presented to the subsystem 118.

The subsystem 118 may be implemented as a positioning subsystem. The subsystem 118 is generally operational to measure a position and a velocity of the device 104. The position and/or the velocity of the device 104 may be calculated, for example, by receiving and processing the signals Sa-Sn transmitted from the navigation satellites 102a-102n. Furthermore, the position and/or the velocity may be determined by network-based triangulation methods. For example, the subsystem 118 may utilize the signals Ca-Cg from the cellular telephone network towers 110a-110g. Other navigation signals may be used to meet the criteria of a particular application.

The position and the velocity may be reported periodically, aperiodically and/or on demand in the signal POSITIONa and the signal VELOCITYa. The rate of reporting generally depends on a current position, a current velocity and/or an acceleration of the device 104. The rate of reporting may also depend on accuracy criteria received in the signal ACCURACY, an indication of motion received in the signal MOTION, an operational mode received via the signal MODE and/or a demand in the signal REQUESTa.

The subsystem 124 may be implemented as an application subsystem. The subsystem 124 generally comprises one or more application processors, dedicated hardware modules, software modules, combinations of hardware and software and/or other computing systems that may execute one or more application programs and/or tasks. The subsystem 124 may exist (i) within the device 104 (for example, running on an application processor in a cellular handset type of device 104), (ii) separately from the device 104 (for example, within a cellular telephone network) or (iii) the subsystem 124 may span the device 104 and other external equipment.

The module 125 may be implemented as a motion detector. The module 125 may be operational to generate information in the signal MOTION by detecting a physical movement of the device 104. Example embodiments of the module 125 may include, but are not limited to, (i) one or more mercury tilt-switches, (ii) a saturated inductor responsive to changes due to motion through the Earth's magnetic field, (iii) a Micro-Electro-Mechanical (MEM) membrane on a silicon device having a capacitance that fluctuates when subjected to mechanical impulses, (iv) a piezoelectric device microphonically responsive to mechanical impulses and/or (v) other sensors that detect whether the equipment is stationary or not.

The subsystem 118 generally comprises a module (or subsystem) 120 and a module (or circuit) 121. The subsystem 120 generally receives the signals Sa-Sn. The module 121 may generate the signal POSITIONa and the signal VELOCITYa. The signal REQUESTa, the signal ACCURACY, the signal MODE and the signal MOTION may be received by the module 121. A signal (e.g., POSITIONj) may be generated and presented from the subsystem 120 to the module 121. A signal (e.g., VELOCITYj) may also be generated by the subsystem 120 and presented to the module 121. The module 121 may generate and present a signal (e.g., REQUESTj) to the subsystem 120.

The subsystem 120 may be implemented as a position measuring subsystem. The subsystem 120 may be operational to calculate a current location of the device 104 continuously based on the signals Sa-Sn and/or the signals Ca-Cg. A velocity of the device 104, a trajectory (or direction) of the device 104 and a current time may also be calculated by the subsystem 120. Other navigation type signals may be used as input to the calculations. Details of an example subsystem 120 may be found in the U.S. Pat. No. 7,375,682.

The module 121 may be implemented as a variable measurement rate module. The module 121 may be operational to report coordinates representing the location of the device 104, and thus the user 106, to the subsystem 124. The reported coordinates generally give the subsystem 124 the impression that the position measurement subsystem 118 is always-on. The reporting may be periodic, aperiodic and/or on demand based on the data received in the signal REQUESTa, the signal MODE, the signal ACCURACY and/or the signal MOTION. In addition to the logical arrangement shown in FIG. 2, the module 121 may be implemented as a part of the subsystem 118, as part of the subsystem 124 or as a separate subsystem standing alone. A partitioning decision may be made according to whichever arrangement yields the lowest overall system power consumption.

Figure 3:
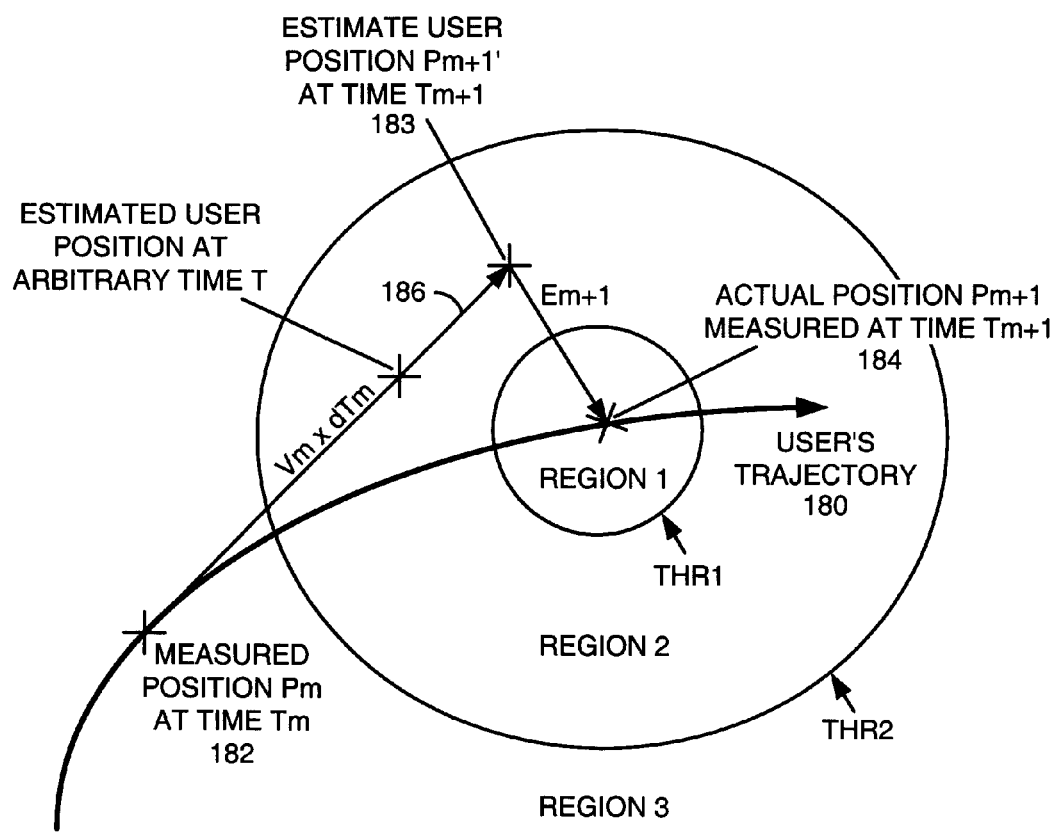
FIG. 3 is a diagram illustrating an example basic operation of a variable measurement rate technique.
Figure 4A:
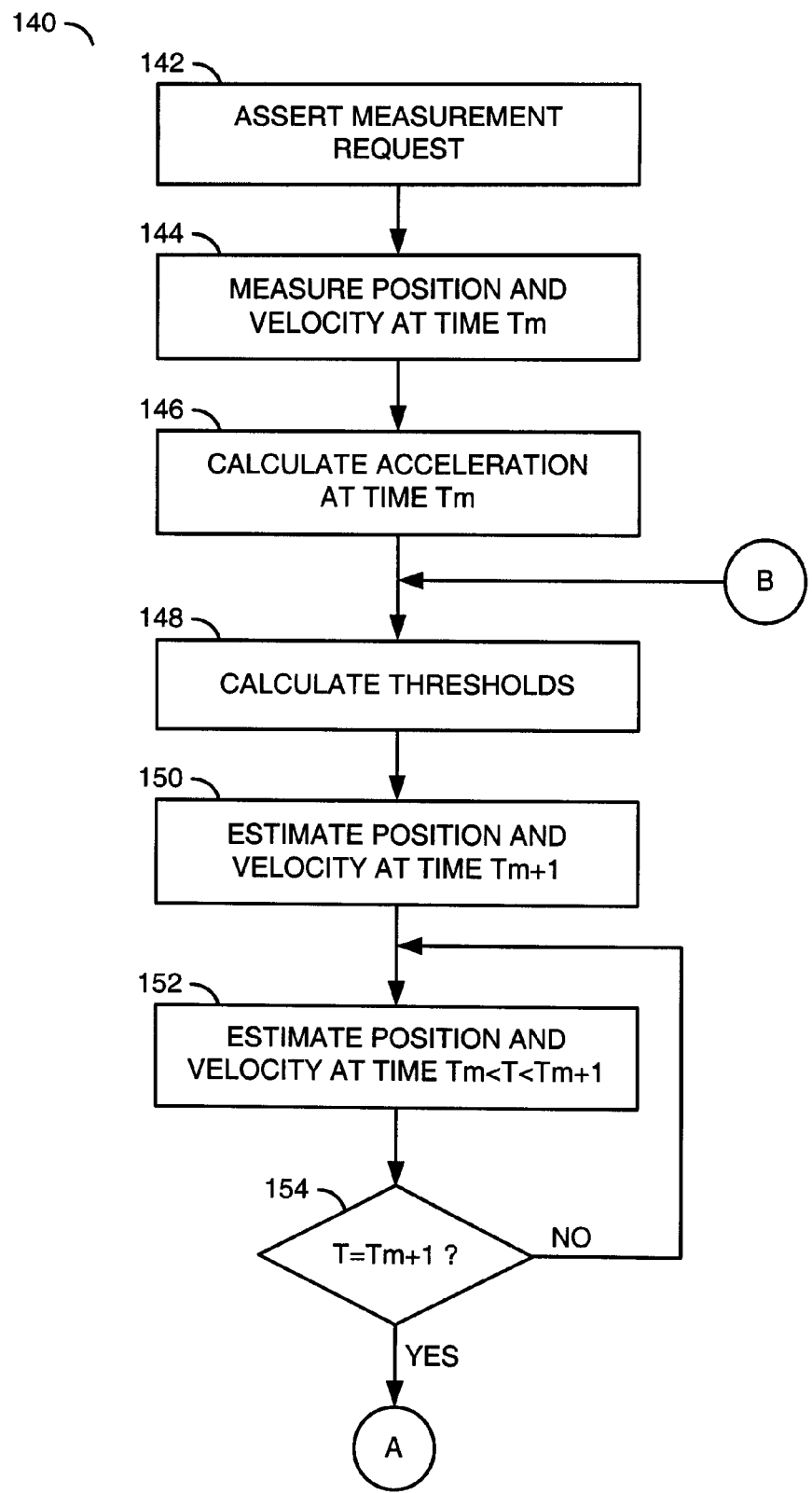
FIGS. 4A and 4B are a flow diagram of a method accompanying the basic operation.
Figure 4B:
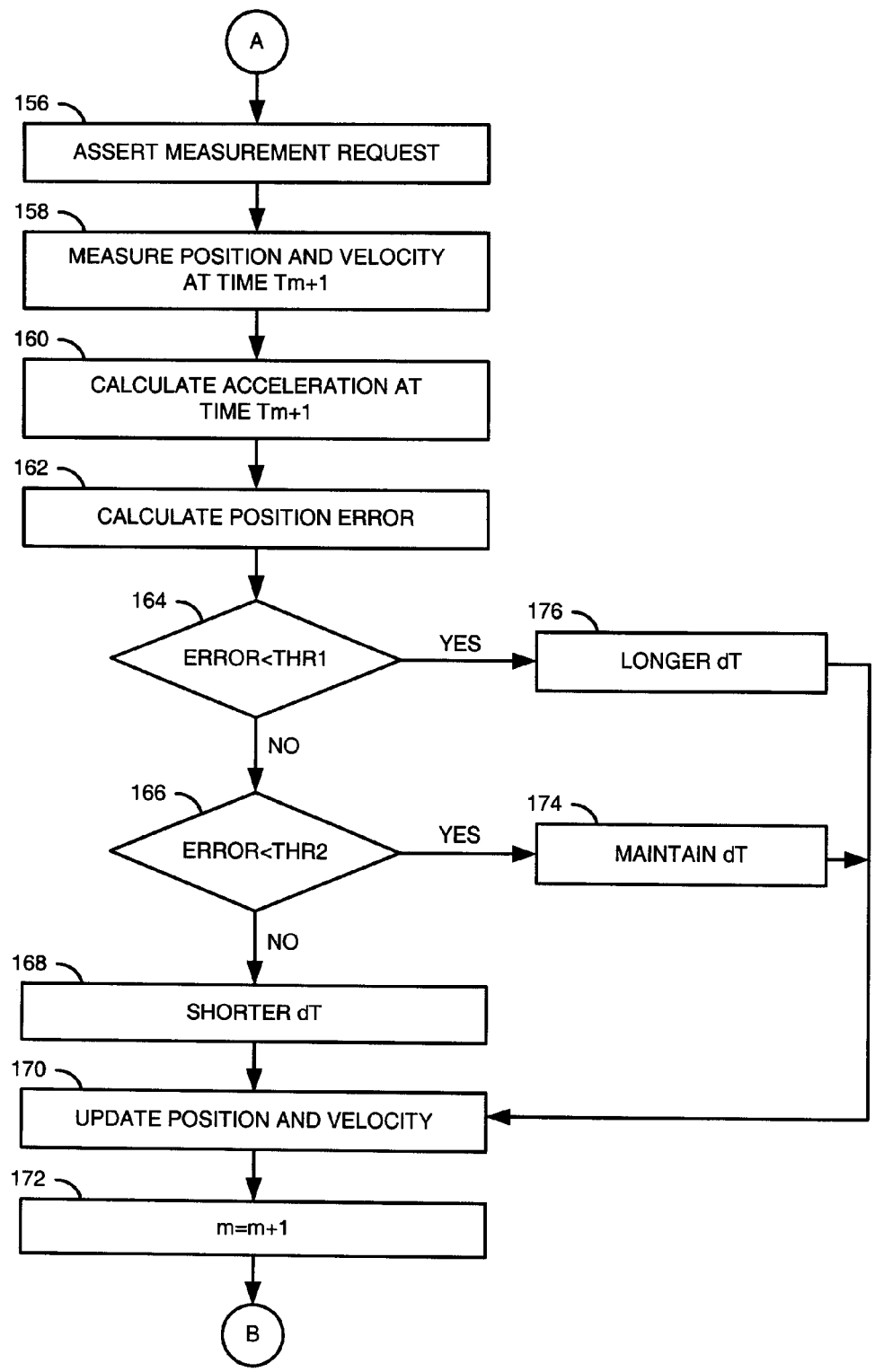

Referring to FIG. 3, a diagram illustrating an example basic operation of the variable measurement rate technique is shown. Referring to FIGS. 4A and 4B, a flow diagram of a method 160 accompanying the basic operation is shown. The method (or process) 160 may implement the variable rate measurement method of the present invention. The method 140 generally comprises a step (or block) 142, a step (or block) 144, a step (or block) 146, a step (or block) 148, a step (or block) 150, a step (or block) 152, a step (or block) 154, a step (or block) 156, a step (or block) 158, a step (or block) 160, a step (or block) 162, a step (or block) 164, a step (or block) 166, a step (or block) 168, a step (or block) 170, a step (or block) 172, a step (or block) 174 and a step (or block) 176.

In the example, the device 104 may be traveling along a path 180. In the step 142, the module 121 may assert the signal REQUESTj at a first time (e.g., Tm) commanding the subsystem 120 to measure a current position (e.g., Pm) and a current velocity (e.g., Vm) of the device 104. The subsystem 120 may respond to the command by measuring the position Pm and the velocity Vm at a point (e.g., 182) along the path 180 in the step 144. The position Pm may be returned in the signal POSITIONj and the velocity Vm may be returned in the signal VELOCITYj to the module 121. In the optional step 146, the module 121 may calculate an acceleration (e.g., Am) of the device 104 at the time Tm. In some embodiments, the module 121 may also calculate one or more thresholds in the step 148 (e.g., THR1 and THR2) for use at a later second time (e.g., Tm+1). The thresholds THR1 and THR2 may be functions of the velocity Vm, the acceleration Am (if known), a condition (e.g., Cm) of the signals Sa-Sn, an accuracy (or quality) value (e.g., Qm) received via the signal ACCURACY and/or time. In some embodiments, the thresholds THR1 and THR2 may be predetermined fixed values.

In the step 150, the module 121 may generate an extrapolated position (e.g., Pm+1' at the point 183) and an extrapolated velocity (e.g., Vm+1') at the time Tm+1. The time Tm+1 may be determined as a sum of the current time Tm and a time step or interval (e.g., dTm) associated with the time Tm (e.g., Tm+1=Tm+dTm). The time interval (or delta time) dTm may have been calculated at an earlier time (e.g., Tm−1) and may start from the time Tm. An inverse of the interval dTm (e.g., $(dTm)^{-1}$) may indicate a measurement rate defined at the time Tm.

The position Pm+1' may be calculated by a linear extrapolation technique based on the position Pm and the velocity Vm (e.g., Pm+1'=Pm+(Vm×dTm)). In some embodiments, one or more sophisticated extrapolation techniques may also be used. For example, calculation of the position Pm+1' may consider the acceleration Am at time Tm (e.g., Pm+1'=Pm+(Vm×dTm)+(0.5×$Am^2$)). In another example, a curve-fitting function may be used to the predict the future trajectory from historical measurements. The calculations may also use one or more previously measured positions (e.g., Pm−1, Pm−2, . . . , Pm−g), one or more previously measured velocities (e.g., Vm−1, Vm−2, . . . , Vm−g) and/of one or more previously determined accelerations (e.g., Am−1, Am−2, . . . , Am−g) to increase an accuracy of the extrapolation.

The device 104 generally travels along the path 180 starting from the point 182 at the time Tm and reading a second point (e.g., 184) at the time Tm+1. Between the time Tm and the time Tm+1, the subsystem 120 may be powered off or placed in a low power mode to conserve power. Therefore, the module 121 may calculate an estimated (projected) position and an estimated (projected) velocity of the device 104 along a projected path 186 between the position Pm and the position Pm+1' in the step 152. The interpolated position and the interpolated velocity may be calculated periodically and/or on demand through the signal REQUESTa. The interpolation method may be similar to the extrapolation method used to calculate Pm+1'. As long as the current time (e.g., T) is earlier than the time Tm+1 (e.g., the NO branch of step 154, the module 121 may continue to generate and report the estimates as appropriate.

When the time T reaches the time Tm+1 (e.g., the YES branch of step 152), the module 121 may reassert the signal REQUESTj to the subsystem 120 in the step 156. At the time Tm+1, the subsystem 120 may once again measure the actual position (e.g., Pm+1) and the actual velocity (e.g., Vm+1) of the device 104 in the step 158. A new acceleration (e.g., Am+1) may optionally be calculated by the module 121 in the step 162.

The module 121 may calculate an error (or difference) value (e.g., Em+1) at the time Tm+1 in the step 162. The calculation may compare the position Pm+1' with the position Pm+1 to determine the value Em+1. The value Em+1 is generally a spatial difference between the position Pm+1' and the position Pm+1 (e.g., Em+1=Pm+1'−Pm+1).

The module 121 may then compare the value Em+1 against the threshold THR1 and the threshold THR2 in the steps 164 and 166. If the value Em+1 is greater than the threshold THR1 (e.g., the NO branch of step 164) and greater than the threshold THR2 (e.g., the NO branch of step 166), the position Pm+1' may be considered too inaccurate (e.g., in a REGION 3). The REGION 3 may be the space greater than the threshold THR2 distance from the position Pm+1. As such, the module 121 may shorten a next interval (e.g., dTm+1) in the step 168 in order to bring a subsequent extrapolated position (e.g., Pm+2') closer to a subsequent measured position (e.g., Pm+2).

In the step 170, the module 121 may update the reported position in the signal POSITIONa to the position Pm+1 and the reported velocity in the signal VELOCITYa to the velocity Vm+1. A next cycle (e.g., m=m+1) may be started by the subsystem 118 in the step 172. At the time Tm+1, the method 140 may continue calculating new thresholds THR1 and THR2 at the step 146.

Returning to step 166, if the value Em+1 is greater than the threshold THR1 and less than the threshold THR2 at the time Tm+1 (e.g., the YES branch of step 166), the extrapolated position Pm+1' may be considered to have an acceptable accuracy (e.g., in a REGION 2). The REGION 2 may be a space less than the threshold THR2 distance and greater than the threshold THR1 distance from the position Pm+1. As such, the module 121 may maintain the next time interval dTm+1 the same as the current interval dTm in the step 174. The method 140 may continue with updating the position and the velocity in the step 170.

If the value Em+1 is less than the threshold THR1 (e.g., the YES branch of step 164), the position Pm+1 may be considered too accurate (e.g., in a REGION 1). The REGION 1 may be a space less than the threshold THR1 distance from the position Pm+1. Therefore, the module 121 may make the next time interval dTm+1 longer than the interval dTm in the step 176. The longer interval dTm+1 may be used to decrease the power consumption rate of the device 104 by making fewer measurements over longer periods while still maintaining an acceptable accuracy (e.g., allow a return to REGION 2). The method 140 may continue with updating the position and the velocity in the step 170.

The calculations for the predicted position Pm+1' and the measurements of the current position Pm may be performed independently from each other. For example, one or more intermediate position/velocity measurements may be made between the time Tm and the time Tm+1 with or without updating the extrapolated position Pm+1'. In another example, the extrapolated position Pm+1' may be calculated and/or updated from an estimated position generated after the time Tm. The independence generally enables the error Em+1 to be estimated before the time Tm+1 is reached. Furthermore, a satellite-related portion of the subsystem 120 may be designed more independently from a position/velocity/time-related portion of the subsystem 120.

The module 121 and/or subsystem 120 may be configured to accommodate several application modules operating substantially simultaneously within the subsystem 124. The module 121 may utilize multiple instances and/or time-sharing to process different accuracy criteria from the various applications resulting in different thresholds and different measurement rates. The subsystem 120 may have a core measurement (GPS) engine for making the actual measurements and several position/velocity/time estimation engines (e.g., several instances and/or time-shared) to handle the various application modules.

Figure 5:
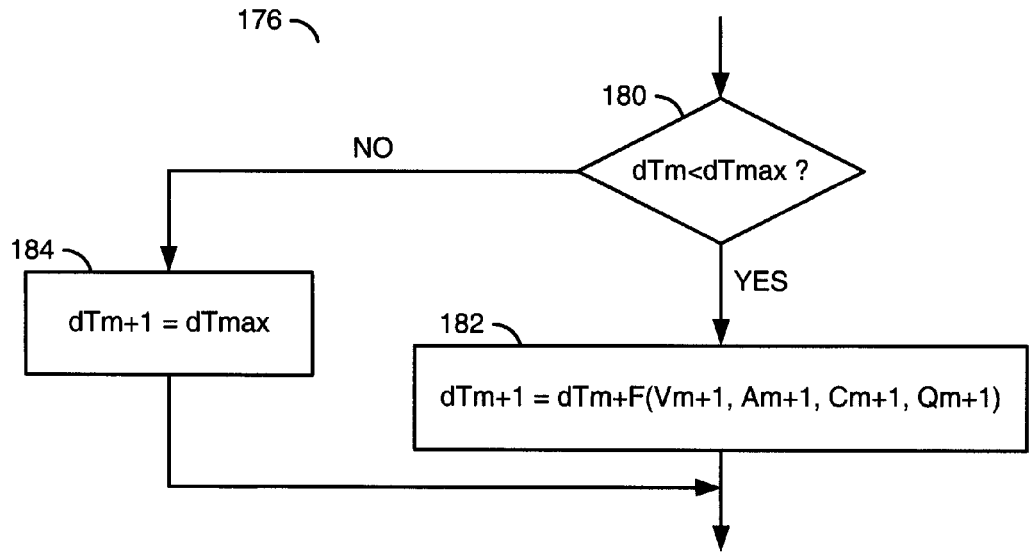
FIG. 5 is a flow diagram of an example implementation of an interval lengthening method.

Referring to FIG. 5, a flow diagram of an example implementation of the interval lengthening step 176 is shown. The step 176 generally comprises a step (or block) 180, a step (or block) 182 and a step (or block) 184.

In the step 180, the interval value dTm may be compared with a maximum value (e.g., dTmax) by the module 121. If the value dTm is less than the value dTmax (e.g., the YES branch of step 180), the module 121 may increase the interval dTm by a function of the velocity Vm+1, the acceleration Am+1, the signal condition Cm+1 and/or the accuracy Qm+1 in the step 182. If the value dTm in not less than the value dTmax (e.g., the NO branch of step 180), the module 121 may set the value dTm+1 to the maximum value dTmax in the step 184.

Figure 6:
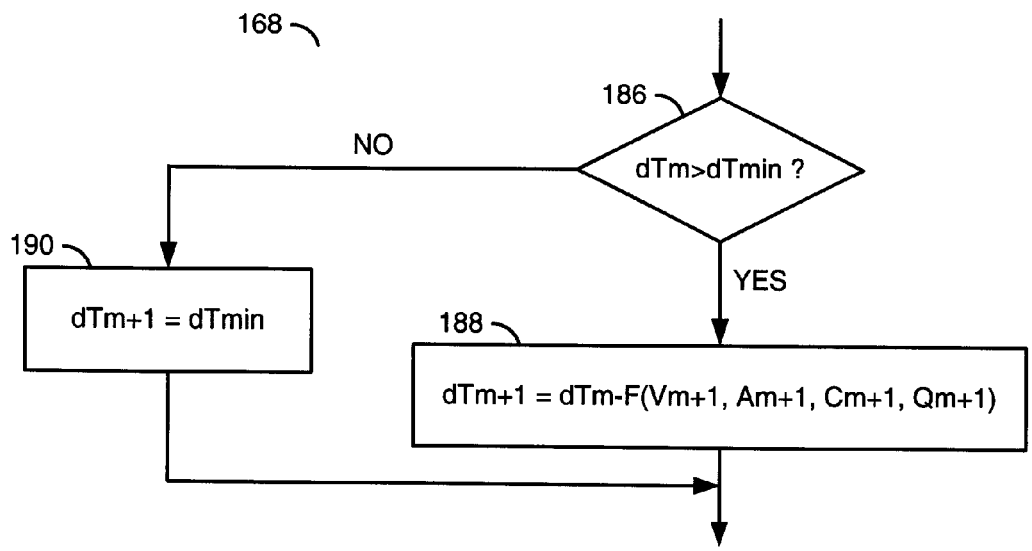
FIG. 6 is a flow diagram of an example implementation of an interval shortening method.

Referring to FIG. 6, a flow diagram of an example implementation of the interval shortening step 174 is shown. The step 174 generally comprises a step (or block) 186, a step (or block) 188 and a step (or block) 190.

In the step 186, the interval value dTm may be compared with a minimum value (e.g., dTmin) by the module 121. If the value dTm is greater than the value dTmin (e.g., the YES branch of step 186), the module 121 may decrease the interval dTm by a function of the velocity Vm+1, the acceleration Am+1, the signal condition Cm+1 and/or the accuracy Qm+1 in the step 188. If the value dTm in not greater than the value dTmin (e.g., the NO branch of step 186, the module 121 may set the minimum value dTm+1 to the value dTmin in the step 190.

The average rate at which the position measurements are made may be (approximately) proportional to the total power consumption in the subsystem 120. Therefore, the interval dTm to the next position measurement may be maximized and/or the measurement rate $(dTm)^{-1}$ may be minimized in order to minimize the power consumption. However, the measurement rate should be sufficient to support the criteria of the application subsystem 124 (e.g., the values in the signal ACCURACY). The following factors may be used individually or in combination with one another to determine the measurement rate: (i) the accuracy criterial, (ii) speed, (iii) motion detection, (iv) a maximum anticipated acceleration, (v) a signal condition and possibly other conditions in the subsystem 120 and/or (vi) a learning capability.

The application subsystem 124 may define the accuracy criteria for the positioning subsystem 118 in the signal ACCURACY. The accuracy criteria may be updated at any time. The accuracy generally depends on the nature of the applications/services in operation. If the value Em+1 exceeds the accuracy criteria, the value dTm+1 should be reduced compared with the value dTm. If the value Em+1 is worse than the accuracy criteria, the value dTm+1 might be increased compared with the value dTm. If the value dTm+1 is within the accuracy criteria, the value dTm+1 may carry the value dTm.

The subsystem 120 generally reports the velocity of the device 104 in the signal VELOCITYj. When the device 104 is stationary, the measurement rate may be reduced compared with when the device 104 is moving. Generally, the measurement rate may be steadily reduced over a number of cycles because a probability of moving is expected to reduce the longer the device 104 has been stationary. While stationary, the measurement rate may be reduced down to the minimum value dTmin. The value dTmin may depend on a maximum expected acceleration and a largest acceptable error when the device 104 starts moving again. As the speed of the device 104 increases, the measurement rate is generally increased to maintain tracking accuracy.

An enhancement may be achieved by defining the accuracy Qm+1 as a function of speed. For example, when the speed exceeds 500 kilometers per hour, the user 106 may be considered to be on an aircraft. The nature of any location-based applications and/or location-based services that may be accessed while flying generally demands considerably less accurate position reporting than when walking or driving. Therefore, the measurement rate may be reduced at high speeds.

The measurement rate may also be based on the motion indicated by the signal MOTION. Under normal conditions, the device 104 is likely to be stationary most of the time. Therefore, a substantial power saving may be realized by completely shutting down the subsystem 120 while stationary. Under such conditions, the module 121 may continuously (e.g., periodically, aperiodically and/or on demand) report the last measured position until the module 125 signals that the device 104 has been moved. Once the device 104 has been moved, normal position measurements may be resumed.

The value Em+1 is generally governed by a deviation from an expected acceleration between times Tm and Tm+1. At the time Tm, a maximum magnitude of acceleration expected during the interval dTm may be predicted. As such, a predefine maximum value for Em+1 may be determined. Conversely, the interval dTm may be calculated from a maximum allowable value for Em+1 by considering the maximum anticipated acceleration.

The maximum anticipated acceleration may be a function of speed. For example, a maximum acceleration (or deceleration) of 100 kilometers per hour per hour ($kMh^{-2}$) may be defined by the maximum braking or acceleration possible in a car. A maximum accelerate (or deceleration) of 500 $kMh^{-2}$ may be defined by the acceleration/deceleration possible in an aircraft.

Figure 7:
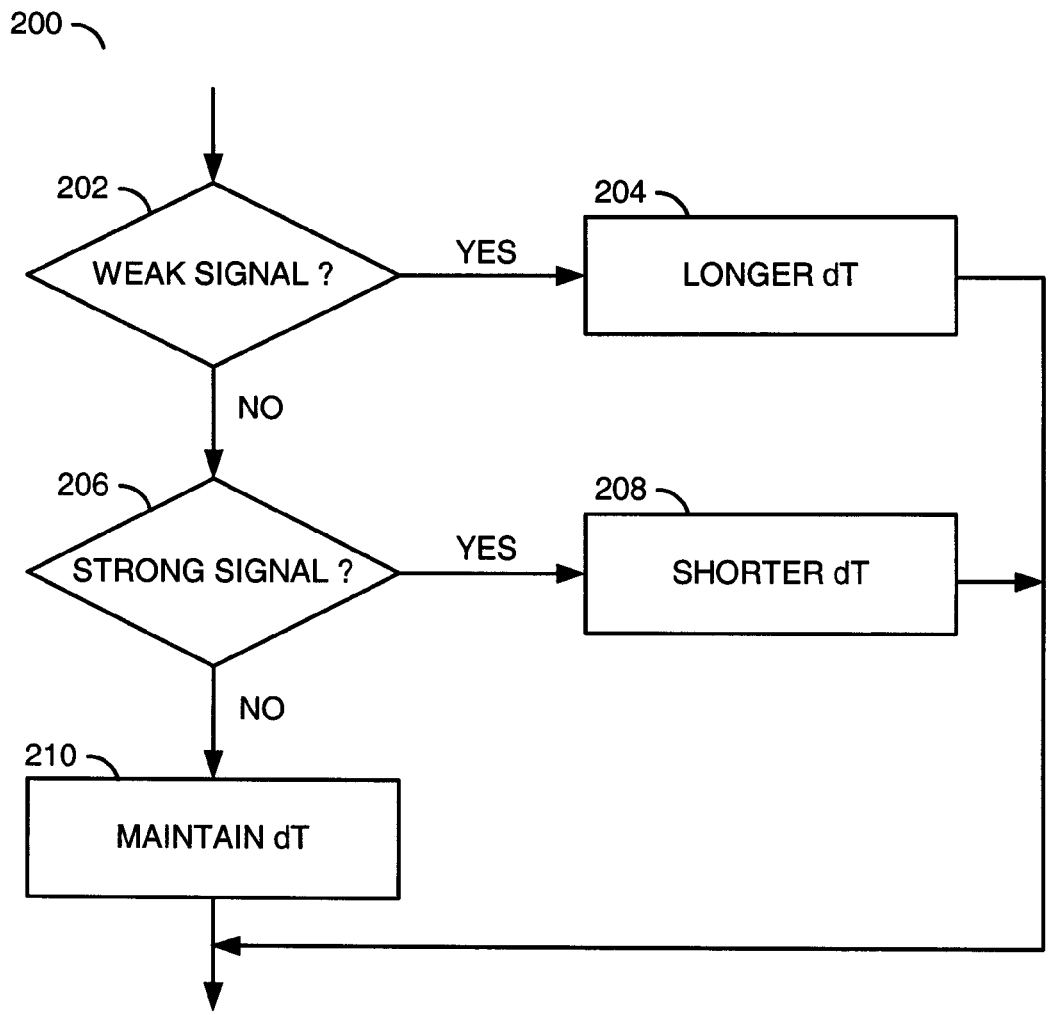
FIG. 7 is a flow diagram of an example method of adjusting the interval.

Referring to FIG. 7, a flow diagram of an example method 200 of adjusting the interval dTm is shown. The method (or process) 200 may account for the condition of the signals Sa-Sn, the signals Ca-Cg and/or other conditions at the subsystem 120. The method 200 generally comprises a step (or block) 202, a step (or block) 204, a step (or block) 206 a step (or block) 208 and a step (or block) 210.

The technology used to implement the subsystem 120 generally depends on an ability to receive radio signals transmitted from a known location, such as the signals Ca-Cg from the cellular network towers 110a-110g and/or the signals Sa-Sn transmitted from the navigation satellites 102a-102n. To minimize power consumption, the interval dTm may depend on signal conditions (e.g., Cm) at an antenna of the subsystem 118.

If a very weak signal is received at the antenna (e.g., the YES branch of step 202), additional processing may be appropriate in the subsystem 120 to recover and interpret the signals. The additional processing generally consumes more power and thus the value dTm may be increased in the step 204 by the module 121 to compensate. If the signals are strong (e.g., the YES branch of step 206), the module 121 may shorten the interval dTm since fewer calculations may be performed in the subsystem 120. If the signal is moderate (e.g., the NO branch of step 206), the interval dTm may remain unchanged per the step 210.

Receiving weak signals at the antenna may indicate that the device 104 is indoors (assuming that the signal transmitters are not also indoors as is the case, for example, with GPS). When indoors, the expected positioning accuracy of the subsystem 120 may be reduced (e.g., due to multipath effects). Under such conditions, the measurement rate may be reduced by the module 121 in the step 204 without any further degradation in the accuracy achieved.

If the device 104 includes a radio transmitter (e.g., in a cellular telephone), the transmitter may jam the receiver in the subsystem 120 from time to time. When the jamming occurs, the interval dTm should be adjusted to reduce the risk of jamming at the next measurement. For example, the interval dTm may be defined to be different from any timeframe definitions used in the transmitting system. Other conditions in the position measurement subsystem 118 may also affect the measurement rate. For example, depending on the implementation of the subsystem 120, increasing the measurement rate to track errors caused by a high rate of change of temperature may be appropriate.

Figure 8:
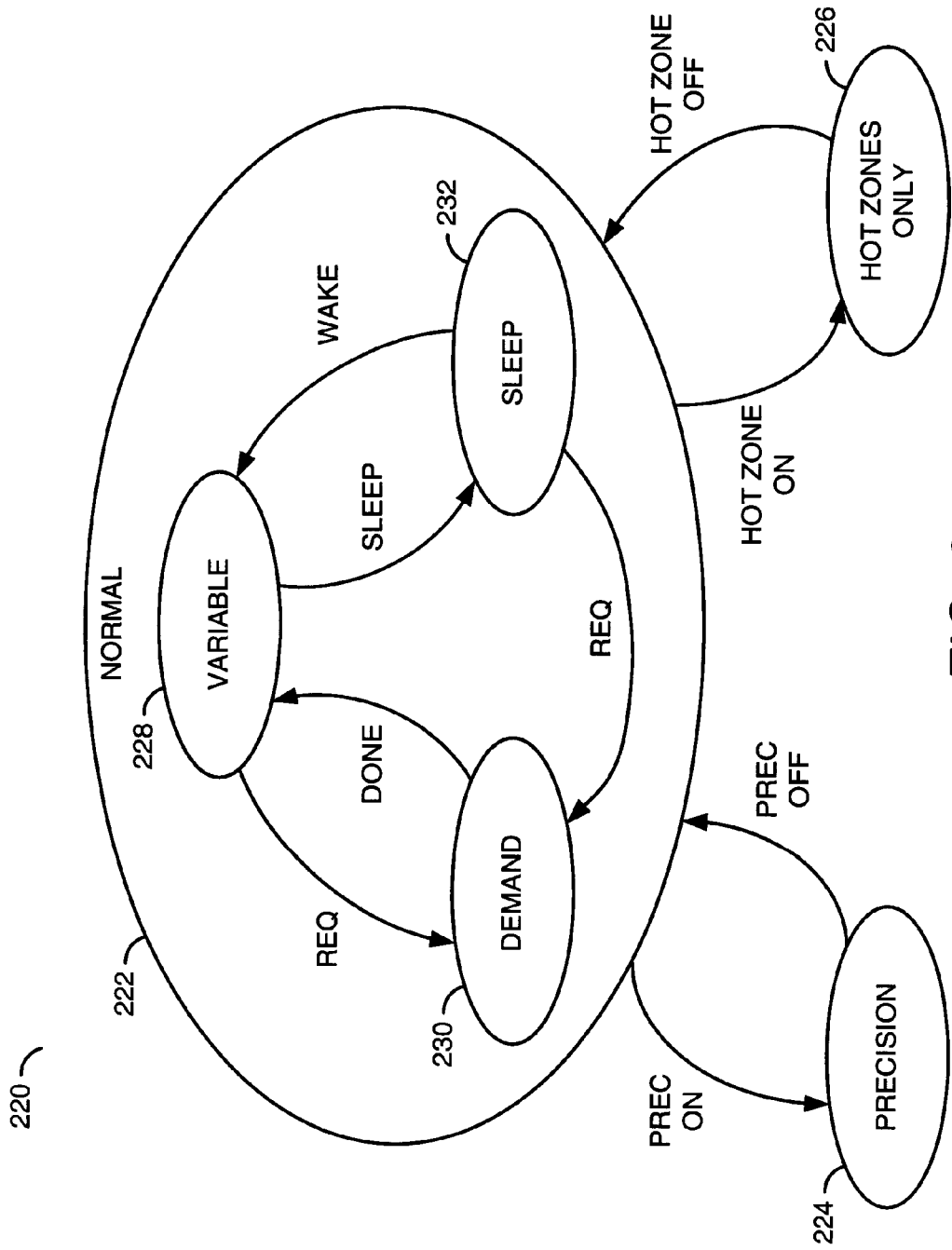
FIG. 8 is a state transition diagram of the device.

Referring to FIG. 8, a state transition diagram 220 of the device 104 is shown. The diagram 220 generally comprises a state (or mode) 222, a state (or mode) 224 and a state (or mode) 226. A transition (e.g., PREC ON) may move from the state 222 to the state 224. A transition (e.g., PREC OFF) may move from the state 224 back to the state 222. The state 226 may be entered from the state 222 via a transition (e.g., HOT ZONE ON). A transition (e.g., HOT ZONE OFF) may move from the state 226 back to the state 222. A current state may be controlled by the subsystem 124 through at least the signal MODE.

The state 222 may be implemented as a normal operating state. While in the state 222, the module 121 may perform several different variable measuring rate techniques, one technique at a time. While in the state 224, the module 121 may fix the interval dTm to a predetermined value (e.g., one second) thereby causing the subsystem 118 to behave as a normal positioning receiver. While in the state 226, the module 121 may adjust the interval based on the hot zones 108a-108k.

The state 222 generally comprises a sub-state (or mode) 228, a sub-state (or mode) 230 and a sub-state (or mode) 232. A transition (e.g., REQ) may move from the sub-state 228 to the sub-state 232 and from the sub-state 232 to the sub-state 230. A return transition (e.g., DONE) may move from the sub-state 230 back to the sub-state 222. A transition (e.g., SLEEP) may move from the sub-state 228 to the sub-state 232. A transition (e.g., WAKE) may move from the sub-state 232 back to the sub-state 228.

While in the sub-state 228, the module 121 may implement the variable measurement rate technique generally described above. While in the sub-state 230, the subsystem 118 may respond to a demand to measure the current position and the current velocity immediately. While in the sub-state 232, the module 121 may increase the interval dTm to a very long time.

The module 121 may incorporate a learning behavior to further reduce the power consumption. For example, the module 121 may learn that the device 104 is normally stationary from some particular time in the evening (e.g., 11 pm) until another time in the morning (e.g., 7 am) every day—probably because the user 106 is normally sleeping. In the example, after 11 pm and once the device 104 has been stationary for a fixed time, the module 121 may send the device 104 to a "sleep mode" by the transition SLEEP. In the sub-state 232, the subsystem 118 may check for movement only very infrequently. At 7 am, the module 121 may switch back to a more active mode by the transition WAKE, where movement is checked for more frequently in anticipation of the user 106 waking up. If the user prompts the device 104 for a new measurement while in the sub-state 232, the module 232 may transition (e.g., REQ) to the sub-state 230. From the sub-state 230, an on demand measurement may be made. Afterwards, the module 228 may transition (e.g., DONE) to the sub-state 228 in anticipation of further motion.

Figure 9:
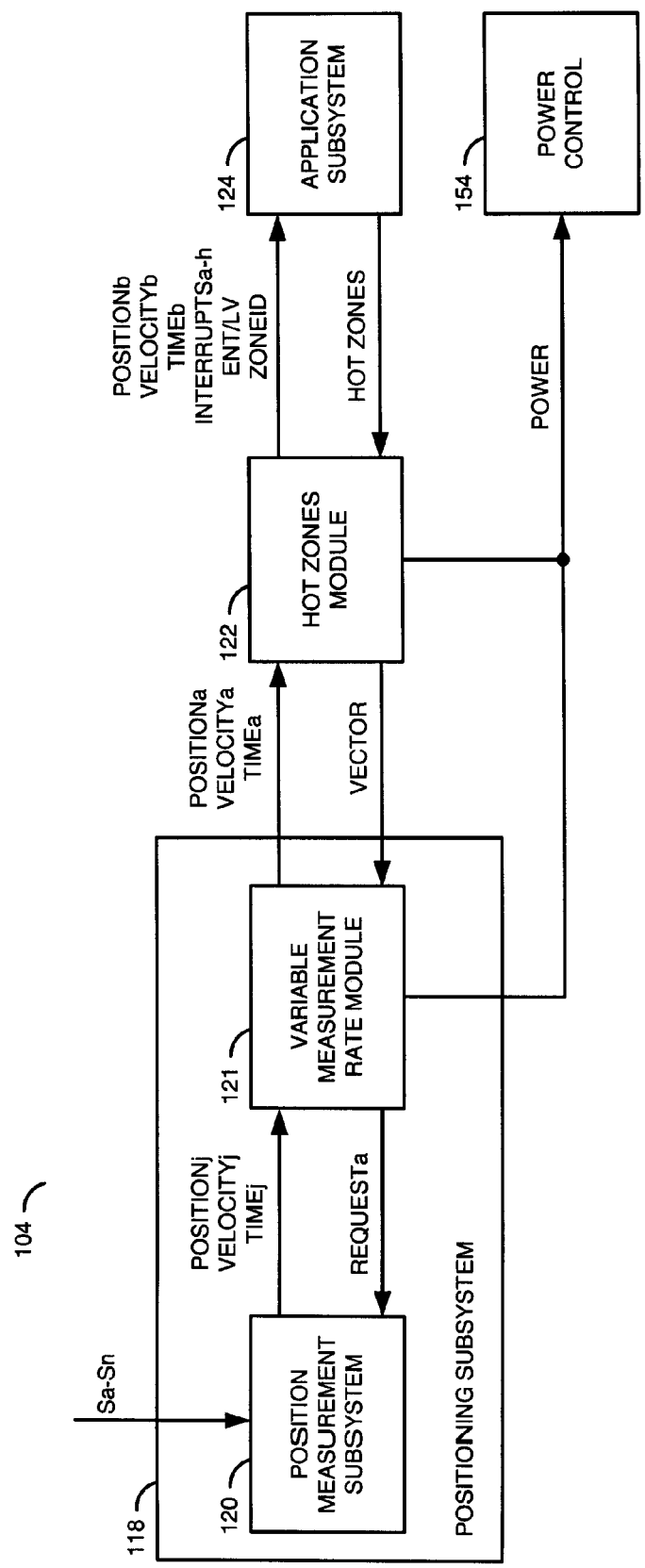
FIG. 9 is an expanded block diagram of the device.

Referring to FIG. 9, an expanded block diagram of the device 104 is shown. The device 104 generally comprises the subsystem 118, the subsystem 124, a module (or circuit) 122 and a module (or circuit) 154. A signal (e.g., TIMEa) may be generated by and presented from the subsystem 118 to the module 124. A signal (e.g., POWER) may be generated by one or both of the subsystem 118 and the module 122 and presented to the module 154. The subsystem 124 may present a signal (e.g., HOT ZONES) to the module 122. A set of signals (e.g., POSITIONb, VELOCITYb, TIMEb, INTERRUPTa-INTERRUPTh, ENT/LV and ZONEID) may be generated by the module 122 and presented to the subsystem 124.

The module 122 may be implemented as a hot zone module. The module 122 may be operational to generate the signals INTERRUPTa-INTERRUPTh based on (i) hot zone definitions received in the signal HOT ZONES and (ii) the signal POSITIONa. Each of the signals INTERRUPTa-INTERRUPTh may be asserted to signal that the device is crossing a boundary of a hot zone 108a-108k. The signal ENT/LV generally indicates if the boundary crossing is an entry into the zone or leaving the zone. The signal ZONEID generally identifies the hot zone 108a-108k associated with the crossing. A position of the crossing may be carried in the signal POSITIONb. A velocity of the device 104 at the crossing may be in the signal VELOCITYb. A time of the crossing may be transferred in the signal TIMEb.

The module 122 may be created in hardware and/or software executing on an application processor within the device 104. In addition to the logical arrangement shown in FIG. 9, the module 122 may be implemented as a part of the subsystem 118, as part of the subsystem 124, or as a separate subsystem standing alone. A partitioning decision may be made according to whichever arrangement yields the lowest overall system power consumption. Details of an example module 122 may be found in the co-pending U.S. patent application Ser. No. 11/613,280.

The module 154 may be implemented as a power control module. The module 154 is generally operational to control power to the hardware and/or execution of software for the subsystem 118, the subsystem 124 and the module 122 based on data received in the signal POWER. Power control may include, but is not limited to, application/removal of electrical power, timing of software execution and/or increasing/decreasing clock speeds.

Figure 10:
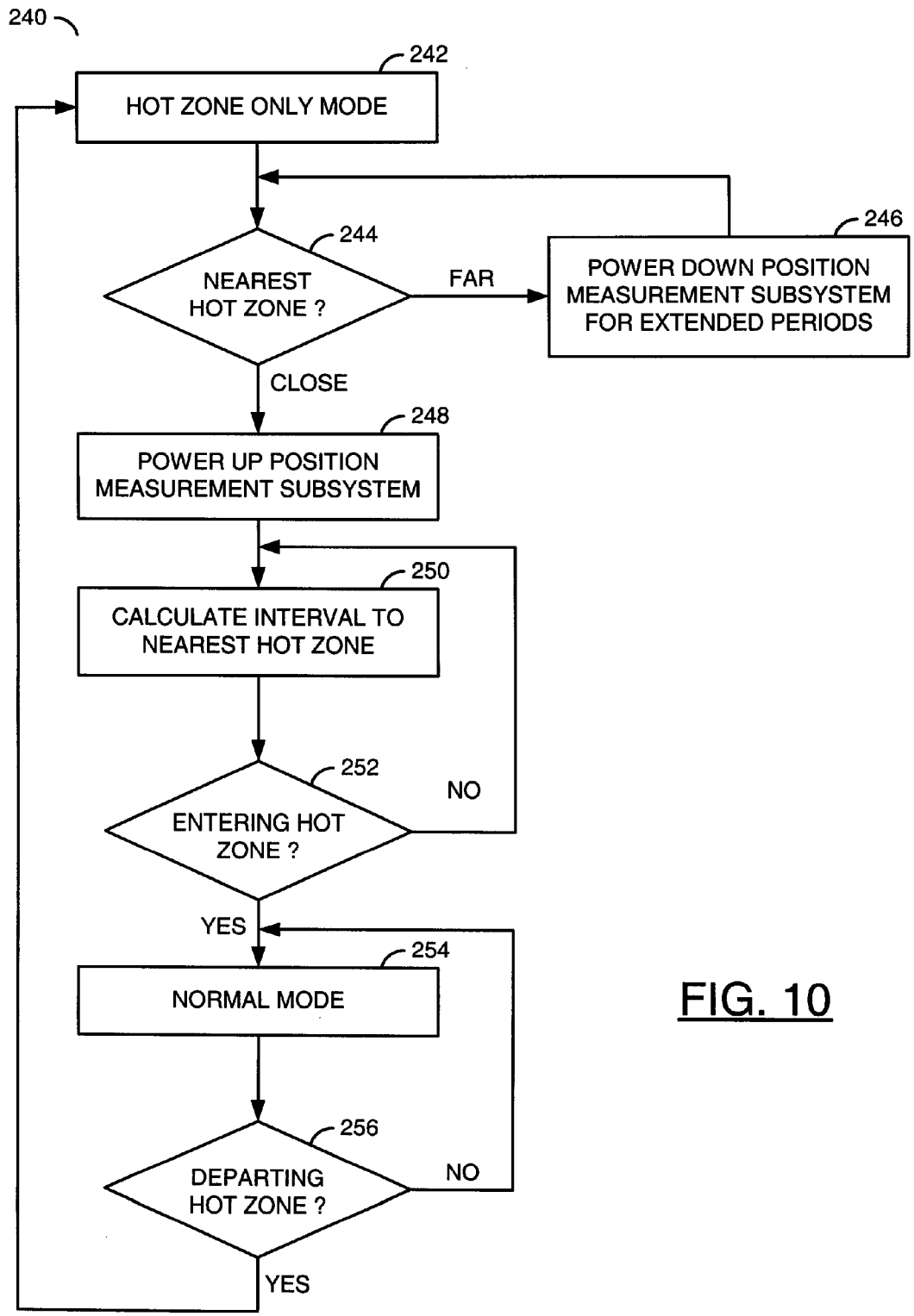
FIG. 10 is a flow diagram of an example method for accommodating hot zones.

Referring to FIG. 10, a flow diagram of an example method 240 for accommodating the hot zones 108a-108k is shown. The method (or process) 240 generally comprises a step (or block) 242, a step (or block) 244, a step (or block) 246, a step (or block) 248, a step (or block) 250, a step (or block) 252, a step (or block) 254 and a step (or block) 256.

One or more of the location-based applications in the subsystem 224 may define the hot zones 108a-108k as areas on the ground (or volumes in space). The module 122 generally compares the hot zones 108a-108k with the position of the device 104. When the device 104 crosses the boundary of a hot zone 108a-108k, the module 122 may interrupt the subsystem 124 and flag the boundary crossing event. Therefore, that total power consumption of the device 104 may be reduced by shutting down the subsystem 124 while waiting for interrupts from the module 122.

In the step 242, the subsystem 124 may command entry into the hot zone state 226 via the signal MODE when the subsystem 124 only expects interrupts from the module 122 instead of periodic position updated. While in the state 226, the module 122 generally reports a vector to a nearest hot zone boundary to the module 121 in the signal VECTOR. By extrapolating from the current position based on the current velocity and the maximum anticipated acceleration, the module 121 may determine an earliest possible time that the device 104 may cross the nearest hot zone boundary. The earliest possible time may then be used as the interval dTm to the next position measurement.

When the device 104 is far from all of the hot zones 108a-108k (e.g., the FAR branch of step 244), the module 121 may control the signal POWER in the step 246 to stop and/or lower the power consumption of the subsystem 120 for extended periods to save considerable power. When the device 104 is close to one or more of the hot zones 108a-108k (e.g., the CLOSE branch of step 244), the module 121 may control the signal POWER to power up and/or increase the power consumption of the subsystem 120 in the step 248. In the step 250, the module 121 may also calculate the interval dTm to the nearest hot zone (e.g., 108a). After the interval dTm, the subsystem 120 may make another measurement of the device position from the signals Sa-Sn to see if the device 104 is at the nearest boundary. The measured position may be reported to the module 122 in the signal POSITIONa.

If the device 104 is not yet entering the nearest hot zone 108a (e.g., the NO branch of step 252), the module 121 may repeat the interval calculation to the hot zone 108. After the interval, the subsystem 120 may repeat the position measurement.

When the device 104 enters the nearest hot zone 108a (e.g., the YES branch of step 252), the module 121 may transition to the normal state 222 in the step 254. The state 222 generally provides the subsystem 124 the requested accuracy by adjusting the interval dTm appropriately. The module 122 may then check for the device 104 leaving the hot zone 108a in the step 256. While the device 104 remains in at least one hot zone 108a-108k (e.g., the NO branch of step 256), the module 121 generally remains in the state 222. When the device 104 leaves all of the hot zones 108a-108k (e.g., the YES branch of step 256), the module 121 may return to the state 226 in the step 240.

The present invention generally comprises a processing engine (e.g., the module 121) that may determine a rate at which position measurements should be made depending on various external factors. The factors may include, but are not limited to, (i) position accuracy criteria determined by location-based applications relying on the position data, (ii) the speed of the device 104 and, more specifically, if the device 104 is stationary, (iii) a maximum anticipated acceleration of the device 104, (iv) in the case of positioning systems based on radio technology, the signal conditions at the receiving antenna and (v) learning typical behavior of the user 106. The performance of the device 104 may be further enhanced with the module 122. In the presence of the module 122, the module 121 generally does not request position measurements from the subsystem 120 until the device 104 is approaching a hot zone boundary.

In the context of battery operated, handheld equipment such as cellular telephones or PDAs, the module 121 may contribute to reducing the power consumption of many different location-based applications and location-based services. The resulting impression of "always-on" positioning may greatly enhance the utility of the applications and services in the subsystem 124.

The function performed by the diagrams of FIGS. 2, 4A, 4B and 5-10 may be implemented using a conventional general purpose digital computer programmed according to the teachings of the present specification, as will be apparent to those skilled in the relevant art(s). Appropriate software coding can readily be prepared by skilled programmers based on the teachings of the present disclosure, as will also be apparent to those skilled in the relevant art(s).

The present invention may also be implemented by the preparation of RFICs, ASICs, FPGAs, or by interconnecting an appropriate network of conventional component circuits, as is described herein, modifications of which will be readily apparent to those skilled in the art(s).

The present invention thus may also include a computer product which may be a storage medium including instructions which can be used to program a computer to perform a process in accordance with the present invention. The storage medium can include, but is not limited to, any type of disk including floppy disk, optical disk, CD-ROM, magneto-optical disks, ROMs, RAMS, EPROMs, EEPROMs, Flash memory, magnetic or optical cards, or any type of media suitable for storing electronic instructions. As used herein, the term "simultaneously" is meant to describe events that share some common time period but the term is not meant to be limited to events that begin at the same point in time, end at the same point in time, or have the same duration.

While the invention has been particularly shown and described with reference to the preferred embodiments thereof, it will be understood by those skilled in the art that various changes in form and details may be made without departing from the spirit and scope of the invention.

The invention claimed is:

1. A method of variable rate measurements in a device having a position module and a rate module, comprising the steps of:
   (A) measuring both a position of said device and a velocity of said device at each of a first time and a second time in response to a plurality of navigation signals received by said position module;
   (B) calculating with said rate module an extrapolated value of said position expected at said second time based on both a first value of said position and a first vector of said velocity at said first time; and
   (C) adjusting an interval in said rate module between said second time and a third time in response to a difference between said extrapolated value and a second value of said position at said second time.

2. The method according to claim 1, wherein step (C) comprises the sub-step of:
   lengthening said interval in response to said difference being less than a minimum threshold.

3. The method according to claim 1, wherein step (C) comprises the sub-step of:
   shorting said interval in response to said difference being greater than a maximum threshold.

4. The method according to claim 3, further comprising the step of:

calculating said maximum threshold at said first time as a function of a maximum anticipated acceleration of said device between said first time and said second time.

5. The method according to claim 3, further comprising the step of:
calculating said maximum threshold at said first time as a function of an accuracy value received in an accuracy signal.

6. The method according to claim 1, further comprising the step of:
estimating both a particular value of said position and a particular vector of said velocity at a particular time between said first time and said second time.

7. The method according to claim 1, further comprising the step of:
reducing a power consumption of said device between said first time and said second time.

8. The method according to claim 1, further comprising the step of:
measuring a second vector of said velocity at said second time, wherein adjusting said interval is in further response to said second vector.

9. The method according to claim 1, wherein adjusting said interval is in further response to a maximum anticipated acceleration of said device as determined at said second time.

10. The method according to claim 1, wherein adjusting said interval is in further response to a signal strength used to measure said position, such that said interval becomes longer as said signal strength becomes weaker.

11. The method according to claim 1, further comprising the step of:
reducing a power consumption of said device while said device is stationary for at least a predetermined duration.

12. The method according to claim 1, further comprising the steps of:
setting said interval to a maximum length at a sleep time; and
setting said interval to a normal length at a wake time, wherein said normal length is shorter than said maximum length.

13. The method according to claim 1, further comprising the steps of:
calculating a minimal time for said device to reach a predefined spatial zone from said first value of said position; and setting said second time to approximately said minimal time after said first time.

14. A device comprising:
a position module configured to measure both a position of said device and a velocity of said device at each of a first time and a second time in response to a plurality of navigation signals; and
a rate module configured to (i) calculate an extrapolated value of said position expected at said second time based on both a first value of said position and a first vector of said velocity
at said first time and (ii) adjust an interval between said second time and a third time in response to a difference between said extrapolated value and a second value of said position at said second time.

15. The device according to claim 14, further comprising an application module configured to perform at least one of (i) a location-based application and (ii) a location-based service in response to said position.

16. The device according to claim 14, further comprising a motion sensor configured to generate a motion signal conveying a movement of said device, wherein said interval is further adjusted in responsive to said motion signal.

17. The device according to claim 14, further comprising a power module configured to control a power consumption in said device in response to a power signal generated by said rate module.

18. The device according to claim 14, further comprising:
a zone module configured to generate a trigger signal in response to said position; and
an application module responsive to said trigger signal.

19. The device according to claim 14, wherein said device comprises at least one of (i) a cell phone, (ii) a laptop computer, (iii) a palm computer, (iv) a personal digital assistant, (v) a heads-up display and (vi) a digital camera.

20. A device comprising:
means for measuring both a position of said device and a velocity of said device at each of a first time and a second time in response to a plurality of navigation signals; and
means for (i) calculating an extrapolated value of said position expected at said second time based on both a first value of said position and a first vector of said velocity at said first time and (ii) adjusting an interval between said second time and a third time in response to a difference between said extrapolated value and a measured value of said position at said second time.

* * * * *